United States Patent [19]

Lotspeich et al.

[11] Patent Number: 5,518,149

[45] Date of Patent: May 21, 1996

[54] CUP DISPENSER FOR VENDING MACHINES

[75] Inventors: Joseph A. Lotspeich, Inver Grove Heights, Minn.; Stephen F. Smith, Warminster, Pa.

[73] Assignee: Gross-Given Manufacturing Company, St. Paul, Minn.

[21] Appl. No.: 281,844

[22] Filed: Jul. 28, 1994

[51] Int. Cl.⁶ ................................................ B65H 3/28
[52] U.S. Cl. ........................................ 221/222; 221/241
[58] Field of Search .................................. 221/222, 223, 221/221, 241, 297, 304

[56] References Cited

U.S. PATENT DOCUMENTS

| | | | |
|---|---|---|---|
| 1,950,382 | 3/1934 | Benson | 312/44 |
| 2,037,751 | 4/1936 | Barbieri | 312/44 |
| 2,184,029 | 12/1939 | Wicklund | 113/114 |
| 2,268,421 | 12/1941 | Reifsnyder et al. | 312/44 |
| 3,000,408 | 9/1961 | Vischer, Jr. | 141/174 |
| 3,071,292 | 1/1963 | Atwood et al. | 221/223 |
| 3,120,324 | 2/1964 | Amberg et al. | 221/4 |
| 3,279,652 | 10/1966 | Willvonseder | 221/223 |
| 3,426,941 | 2/1969 | Hovekamp | 221/222 |
| 3,712,483 | 1/1973 | Messervey | 214/6 |
| 3,899,102 | 8/1975 | Lack et al. | 221/6 |
| 3,905,178 | 9/1975 | West | 53/328 |
| 3,932,978 | 1/1976 | Kinney | 53/37 |
| 3,935,967 | 2/1976 | Doucette | 221/222 |
| 3,958,720 | 5/1976 | Anderson | 221/93 |
| 4,180,180 | 12/1979 | Fries, Jr. | 221/1 |
| 4,193,321 | 3/1980 | King | 74/567 |
| 4,234,070 | 11/1980 | Heiman | 194/1 |
| 4,234,101 | 11/1980 | Pastore | 221/241 |
| 4,241,848 | 12/1980 | Young | 221/222 |
| 4,327,843 | 5/1982 | Corley | 221/210 |
| 4,359,147 | 11/1982 | Levasseur | 194/1 |
| 4,395,250 | 7/1983 | King | 474/111 |
| 4,395,251 | 7/1983 | King et al. | 474/111 |
| 4,426,017 | 1/1984 | Ficken et al. | 221/222 |
| 4,436,222 | 3/1984 | Taylor et al. | 221/223 |
| 4,458,187 | 7/1984 | Heiman | 318/490 |
| 4,478,353 | 10/1984 | Levasseur | 221/14 |
| 4,572,404 | 2/1986 | Cheeseman | 221/223 |
| 4,580,697 | 4/1986 | Maulshagen et al. | 221/223 |
| 4,609,792 | 9/1986 | Levasseur | 200/5 |
| 4,632,023 | 12/1986 | King | 991/302 |
| 4,632,024 | 12/1986 | Cortese | 99/293 |
| 4,666,060 | 5/1987 | Bouldin | 221/11 |
| 4,712,049 | 12/1987 | Houserman | 318/112 |
| 4,741,458 | 5/1988 | Odorici | 221/221 |
| 4,742,937 | 5/1988 | Blom | 221/223 |
| 4,785,927 | 11/1988 | Dobbins | 194/200 |
| 4,804,108 | 2/1989 | Ficken | 221/223 |
| 4,817,010 | 3/1989 | Dobbins | 364/479 |
| 4,835,412 | 5/1989 | Hudis et al. | 307/119 |
| 4,854,479 | 8/1989 | Callahan et al. | 221/304 |
| 4,897,019 | 1/1990 | Lemaire et al. | 414/795 |
| 4,903,586 | 2/1990 | King | 99/287 |
| 4,967,647 | 11/1990 | King | 99/280 |
| 4,967,930 | 11/1990 | Koltze | 221/222 |
| 4,974,751 | 12/1990 | King | 222/142 |
| 4,995,110 | 2/1991 | McGarry | 379/155 |
| 5,111,962 | 5/1992 | Oden | 221/1 |
| 5,127,508 | 7/1992 | Teague | 194/234 |
| 5,131,563 | 7/1992 | Yablans | 221/92 |
| 5,143,430 | 9/1992 | Craven et al. | 312/291 |
| 5,147,068 | 9/1992 | Wright | 221/9 |
| 5,147,069 | 9/1992 | Dubik | 221/79 |

FOREIGN PATENT DOCUMENTS 913384  12/1962  United Kingdom.

*Primary Examiner*—Kenneth Noland
*Attorney, Agent, or Firm*—Merchant, Gould, Smith, Edell, Welter & Schmidt

[57] ABSTRACT

The present invention provides an apparatus that dispenses a lowermost cup from a stack of nested cups. The cups are disposed within an opening formed through an annular housing, and a group of cam assemblies project inward from the housing to support and selectively dispense the cups. Alignment holes are formed through the housing and the cam assemblies to facilitate proper alignment of the cam assemblies relative to one another during assembly of the dispenser. The cam assemblies move inward and outward relative to the opening to accommodate cups of different under-rim diameters within a given range. In particular, the cam assemblies move in an arc and pivot relative to the housing and thereby remain satisfactorily aligned relative to the center of the opening over a wider range of under-rim cup diameters.

25 Claims, 6 Drawing Sheets

CUP DISPENSER FOR VENDING MACHINES

FIELD OF THE INVENTION

The present invention relates to a device for dispensing a lowermost cup from a nested stack of cups, such as those typically associated with vending machines.

BACKGROUND OF THE INVENTION

U.S. Pat. No. 4,426,017 to Ficken et al. discloses an apparatus for dispensing containers from a stack of nested containers. The Ficken et al. device dispenses the lowermost cup from a stack of nested cups and is adjustable to accommodate a range of under-rim cup diameters. However, the range of accommodation provided by the Ficken et al. device is somewhat limited, at least to the extent that two embodiments are required to accommodate under-rim diameters ranging in size from 1.9375 to 3.6875 inches. Accordingly, the need remains for a single cup dispenser that can accommodate essentially the entire range of cup diameters used in the vending industry.

An object of the present invention is to provide a new and improved cup dispenser for vending machines and the like.

Another object of the present invention is to provide a cup dispenser that can accommodate essentially the entire range of under-rim cup diameters encountered in the vending industry.

Another object of the present invention is to provide a cup dispenser that is also cost effective to manufacture and maintain.

Another object of the present invention is to provide a cup dispenser that is also reliable and durable in use.

These objectives and others will become apparent upon a more detailed description of a preferred embodiment of the present invention.

SUMMARY OF THE INVENTION

The present invention provides an apparatus that dispenses a lowermost cup from a stack of nested cups. The cups are disposed within an opening formed through an annular housing, and a group of cam assemblies project inward from the housing to support and selectively dispense the cups. Alignment holes are formed through the housing and the cam assemblies to facilitate proper alignment of the cam assemblies relative to one another during assembly of the dispenser. The cam assemblies move inward and outward relative to the opening to accommodate cups of different under-rim diameters within a given range. In particular, the cam assemblies move in an arc and pivot relative to the housing and thereby remain satisfactorily aligned relative to the center of the opening over a wider range of under-rim cup diameters. In this regard, the preferred embodiment of the present invention functions with under-rim cup diameters ranging in size from 2.5 to 3.4375 inches, thereby accommodating over 95% of the cups used in the vending machine industry.

BRIEF DESCRIPTION OF THE DRAWING

In the Figures of the Drawing, wherein like numerals represent like parts and assemblies throughout the several views.

DETAILED DESCRIPTION OF A PREFERRED EMBODIMENT

A preferred embodiment dispenser constructed according to the principles of the present invention is designated as 100 in the accompanying Figures. The dispenser 100 generally includes an upper housing member 120 and a lower housing member 130 which are secured to one another to form a housing 140. A ring 150 fits within and is free to rotate relative to the lower housing member 130. An upper case member 160 and a lower case member 170 are secured to one another to form a case 180 that fits within and rotates relative to the housing 140. A plurality of cam assemblies 190 are pivotally mounted within the case 180 so as to accommodate different sizes of cups or other articles to be dispensed.

Figure 2:
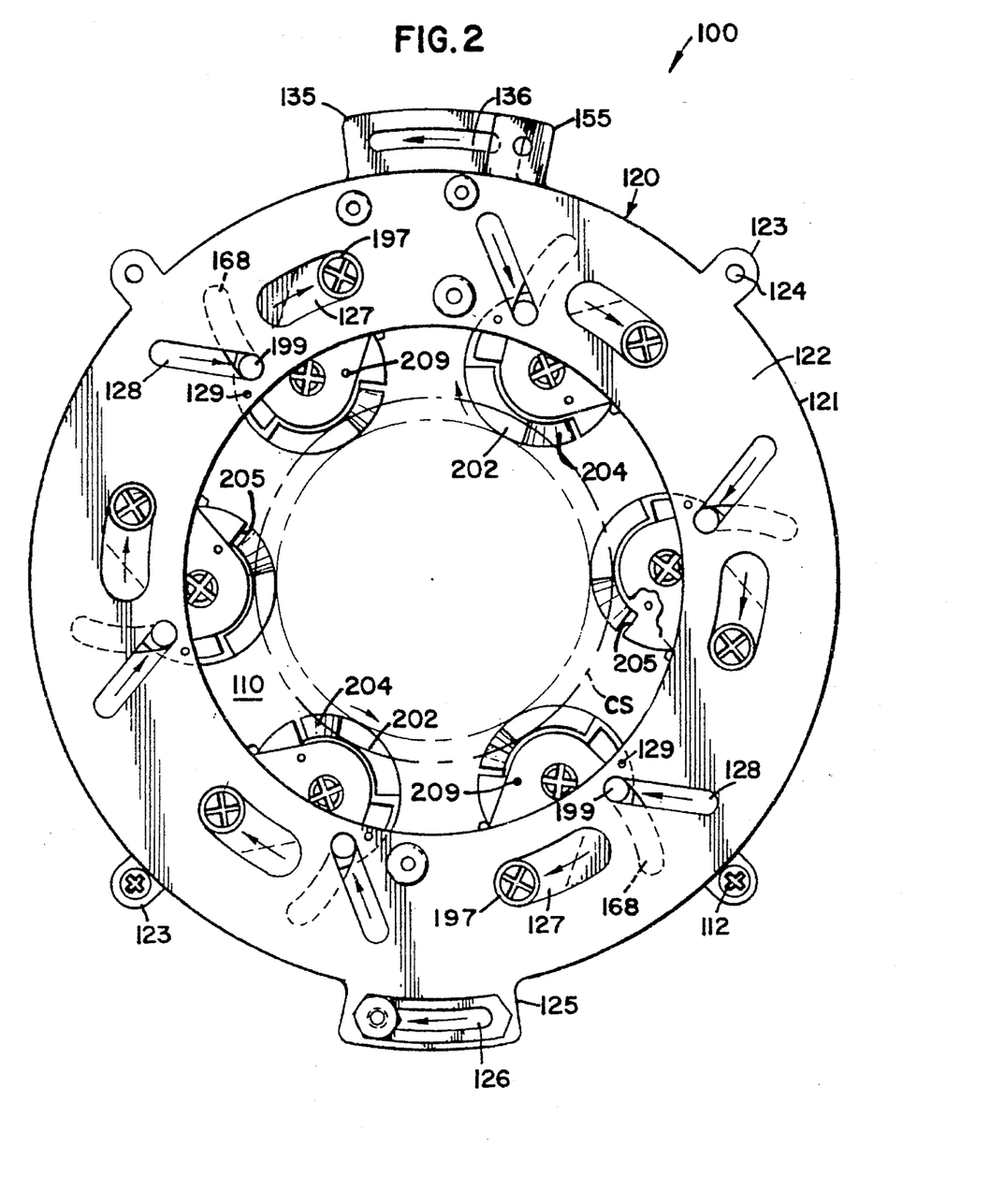
FIG. 2 is a top view of the cup dispenser depicted in FIG. 1, shown in a second configuration that accommodates cups of a minimum under-rim cup diameter within a range of such diameters.
Figure 3:
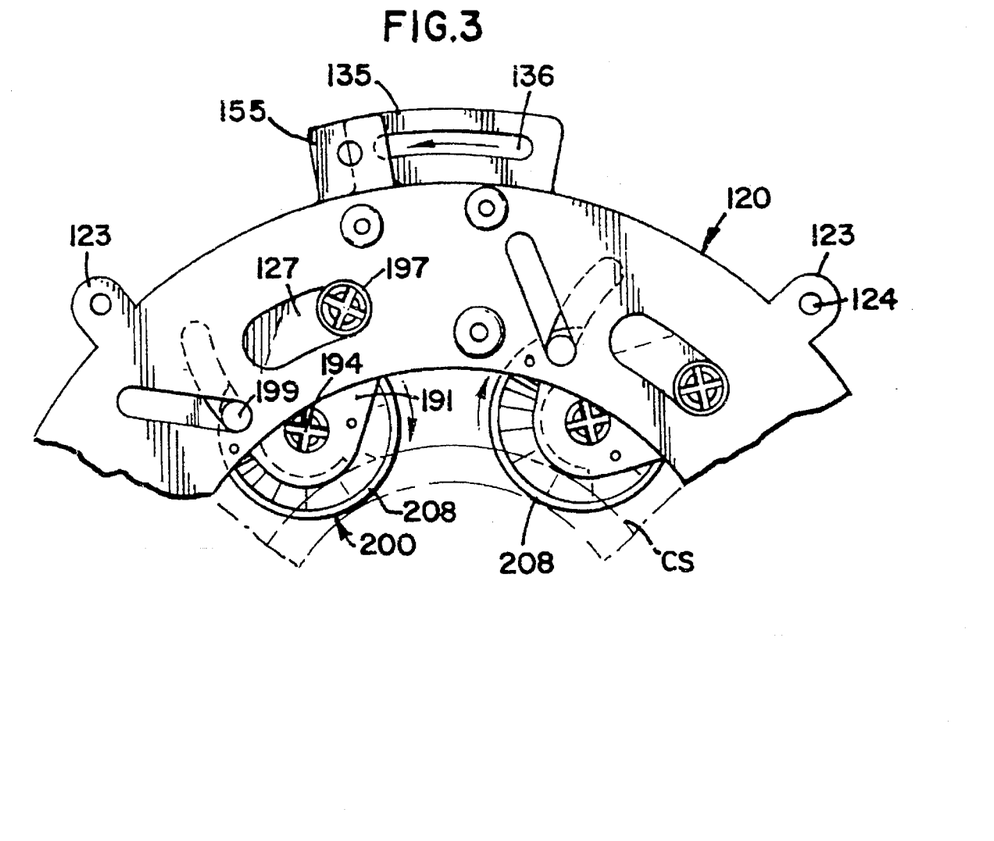
FIG. 3 is a top view of a portion of the cup dispenser depicted in FIG. 2, with arrows showing the relative movements of certain components thereof.

In the interest of manufacturing efficiency, the upper and lower housing members 110 and 120 are identical to one another and hence, may be described with reference to the upper housing member 120 shown in FIG. 2. The upper housing member 120 includes a cylindrical wall 121 joined at one end to an annular end plate 122, which provides a circular or central opening 110 that is concentric with and smaller in diameter than the cylindrical wall 121. A plurality of posts 123 are disposed outside the cylindrical wall 121, and a hole 124 is formed through each of the posts 123 to provide a means for connecting the two housing members together. The posts 123 may be said to be diametrically opposed to one another and circumferentially spaced at equal distances around the cylindrical wall 121.

A flange 125 extends radially outward from the cylindrical wall 121 at a discrete location, and an arcuate slot 126 is formed in the flange 125 for reasons that will become apparent below. The arcuate slot 126 and the cylindrical wall 121 may be said to be concentric. When the dispenser 100 is assembled, the housing members are arranged to face one another and are rotated relative to one another so that the flange 125 on the upper housing member 120 is diametrically opposed to the flange 135 on the lower housing member 130. Screws 112 are threaded through the holes in the posts to secure the two housing members relative to one another. In particular, two screws 112 thread first into the posts 123 on the upper housing member 120, and two screws 112 thread first into the posts 133 on the lower housing member 130.

A plurality of arcuate slots 127 are formed in the end plate 122 for reasons that will become apparent below. The arcuate slots 127 may be said to be diametrically opposed to one another and circumferentially spaced at equal distances around the end plate 122. The arcuate slots 127 and the cylindrical wall 121 may be said to be concentric. A plurality of linear slots 128 are formed in the end plate 122 for reasons that will become apparent below. The linear slots 128 may be said to be diametrically opposed to one another and circumferentially spaced at equal distances around the end plate 122. The linear slots 128 may be said to be approximately tangentially oriented relative to the rim of a minimum diameter cup CS disposed within the central opening 110. A plurality of circular apertures 129 are formed through the end plate 122 for reasons that will become apparent below. The apertures 129 may be said to be diametrically opposed to one another and circumferentially spaced at equal distances around the end plate 122.

Figure 1:
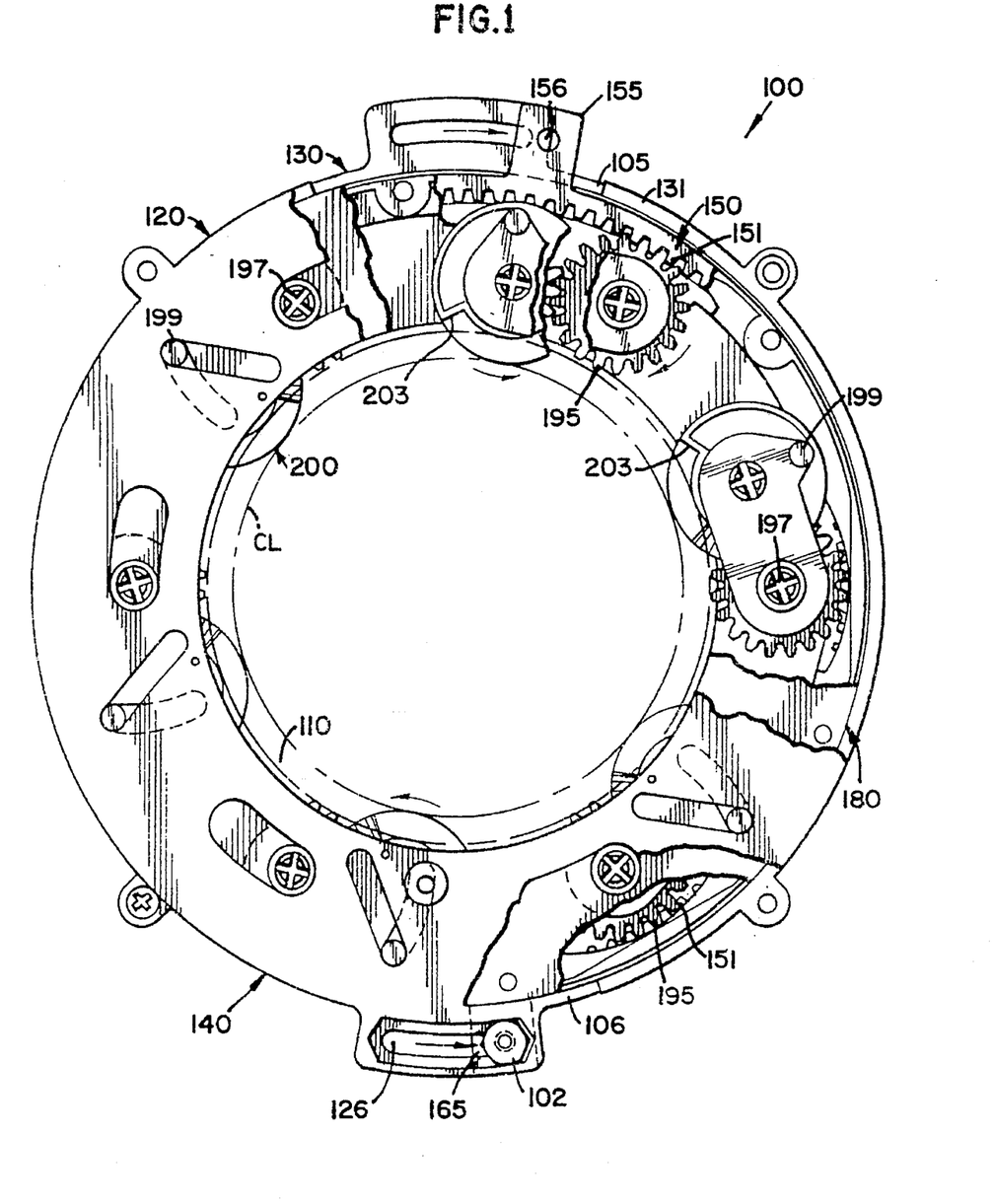
FIG. 1 is a top view of a preferred embodiment cup dispenser constructed according to the principles of the present invention, shown in a first configuration that accommodates cups of a maximum under-rim cup diameter within a range of such diameters, with portions of the cup dispenser broken away to show certain internal components thereof.

As shown in FIG. 1, the ring 150 is disposed within the lower housing member 130 and may be said to be concentrically nested within the cylindrical wall 131 thereof. The ring 150 includes gear teeth 151 that extend radially inward toward the central opening 110 for reasons that will become apparent below. The ring 150 further includes a lever 155 that extends radially outward from the ring 150 and through an opening 105 in the cylindrical wall 131. Subject to the edges of the opening 105 confining the lever 155, the ring 150 is otherwise free to rotate within the lower housing member 130. A hole 156 is formed through the lever 155 to provide a means for connecting the lever 155 to an actuating mechanism.

Figure 4:
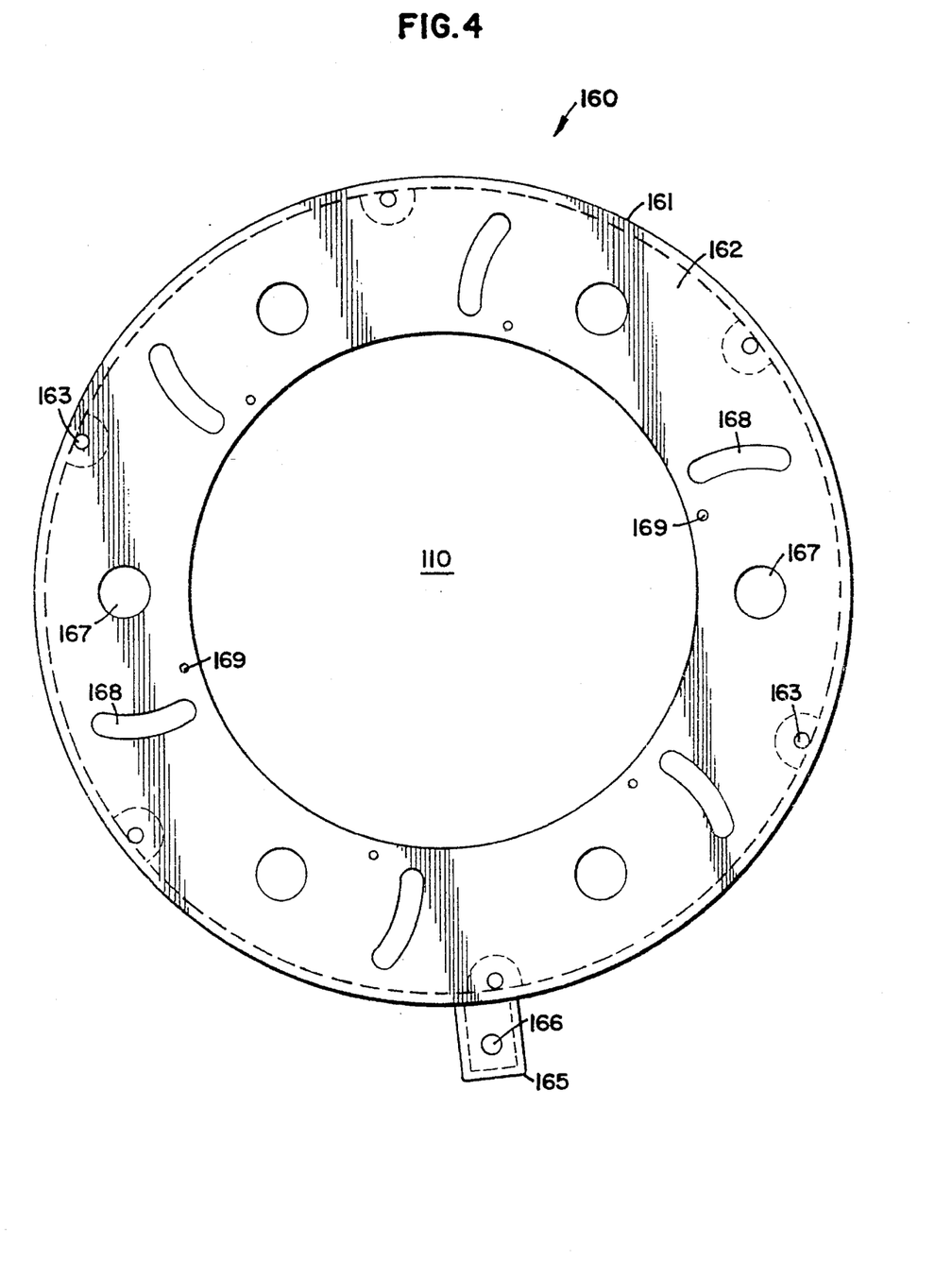
FIG. 4 is a top view of an upper case member that is one of the internal components of the cup dispenser depicted in FIG. 1.

Contrary to the housing members, the upper and lower case members 160 and 170 are not identical to one another. As shown in FIG. 4, the upper case member 160 includes a cylindrical wall 161 joined at one end to an annular end plate 162 which similarly defines or borders the central opening 110. A plurality of holes 163 are formed through the end plate 162 to provide a means for connecting the two case members together. The holes 163 may be said to be diametrically opposed to one another and circumferentially spaced at equal distances around the end plate 162. A tab 165 extends radially outward from the cylindrical wall 161 at a discrete location, and through an opening 106 in the cylindrical wall 121 of the upper housing member 120. For reasons that will become apparent below, a hole 166 is formed through the tab 165 to provide a means for securing the tab 165 in a desired position relative to the flange 125 on the upper housing member 120.

A plurality of relatively larger holes 167 are formed in the end plate 162 for reasons that will become apparent below. The relatively larger holes 167 may be said to be diametrically opposed to one another and circumferentially spaced at equal distances around the end plate 162. A plurality of arcuate slots 168 are formed in the end plate 162 for reasons that will become apparent below. The arcuate slots 168 may be said to be diametrically opposed to one another and circumferentially spaced at equal distances around the end plate 162. Each of the arcuate slots 168 is centered about a respective relatively larger hole 167. A plurality of circular apertures 169 are formed through the end plate 162 for reasons that will become apparent below. The apertures 169 may be said to be diametrically opposed to one another and circumferentially spaced at equal distances around the end plate 162.

Figure 5:
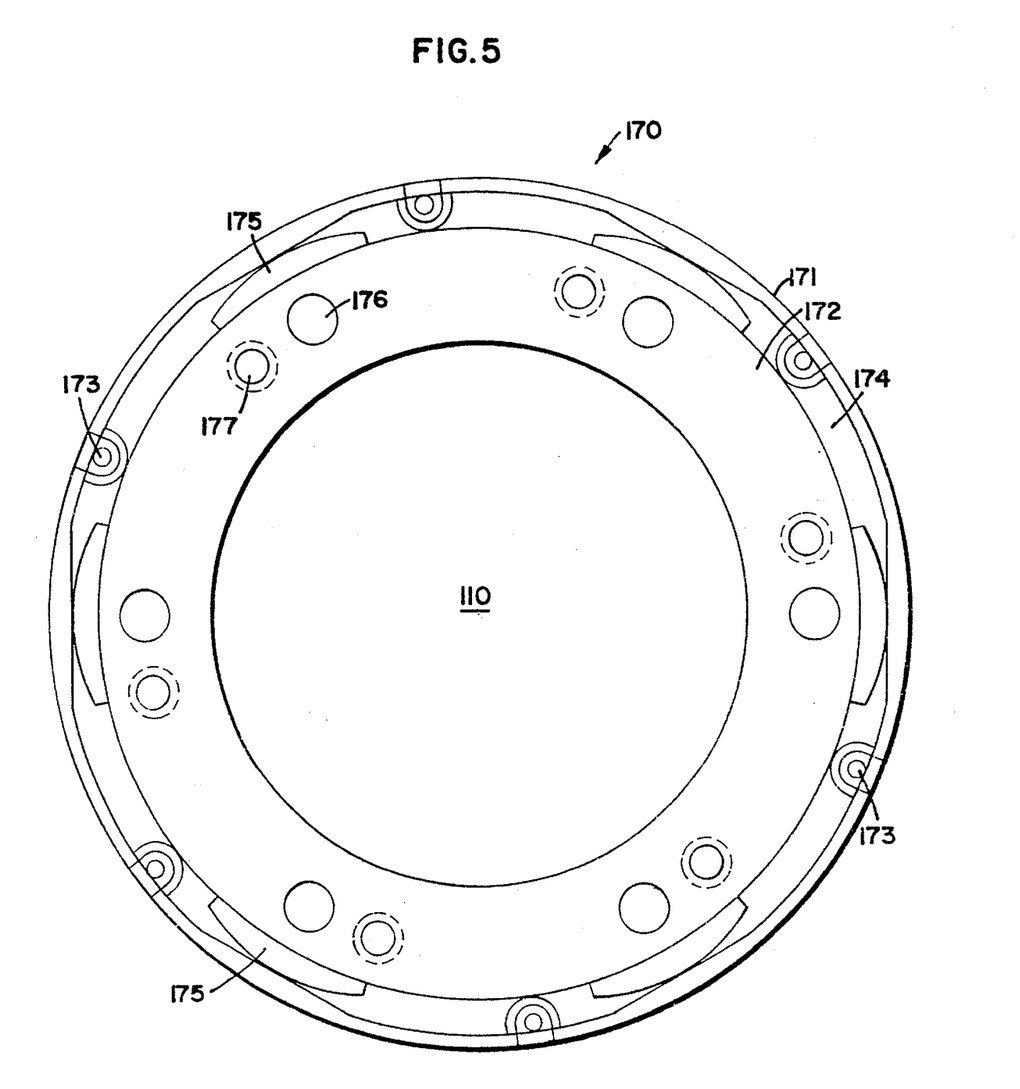
FIG. 5 is a top view of a lower case member that is another of the internal components of the cup dispenser depicted in FIG. 1.

As shown in FIG. 5, the lower case member 170 includes a cylindrical wall 171 joined at one end to an annular end plate 172 which similarly defines or borders the central opening 110. A plurality of holes 173 are formed through the end plate 172 to provide a means for connecting the two case members together. The holes 173 may be said to be diametrically opposed to one another and circumferentially spaced at equal distances around the end plate 172. A step or shoulder 174 is formed in the cylindrical wall 171, and a plurality of openings 175 are formed in the shoulder 174 and up toward the end plate 172 for reasons that will become apparent below. The openings 175 may be said to be diametrically opposed to one another and circumferentially spaced at equal distances around the cylindrical wall 171.

A plurality of circular holes 176 are formed in the end plate 172 for reasons that will become apparent below. The holes 176 may be said to be diametrically opposed to one another and circumferentially spaced at equal distances around the end plate 172. A plurality of nubs 177 extend outward from the end plate 172 for reasons that will become apparent below. The nubs 177 may be said to be diametrically opposed to one another and circumferentially spaced at equal distances around the end plate 172. When the cam assemblies 190 are properly disposed between the case members, screws are threaded through the holes 163 and 173 in the end plates 162 and 172, respectively, to secure the two case members 160 and 170 relative to one another.

Figure 6:
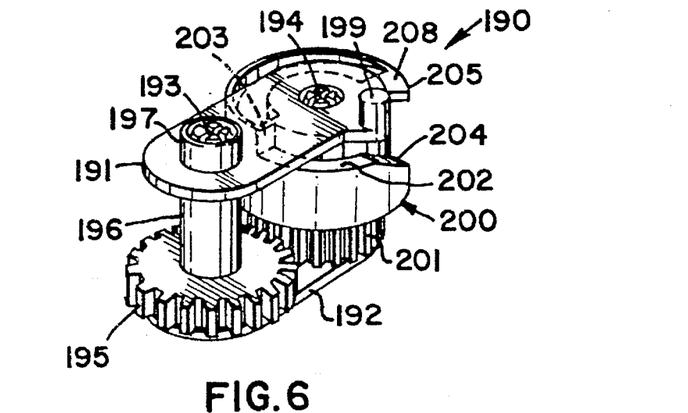
FIG. 6 is a perspective view of a cam assembly that is another of the internal components of the cup dispenser depicted in FIG. 1.
Figure 7:
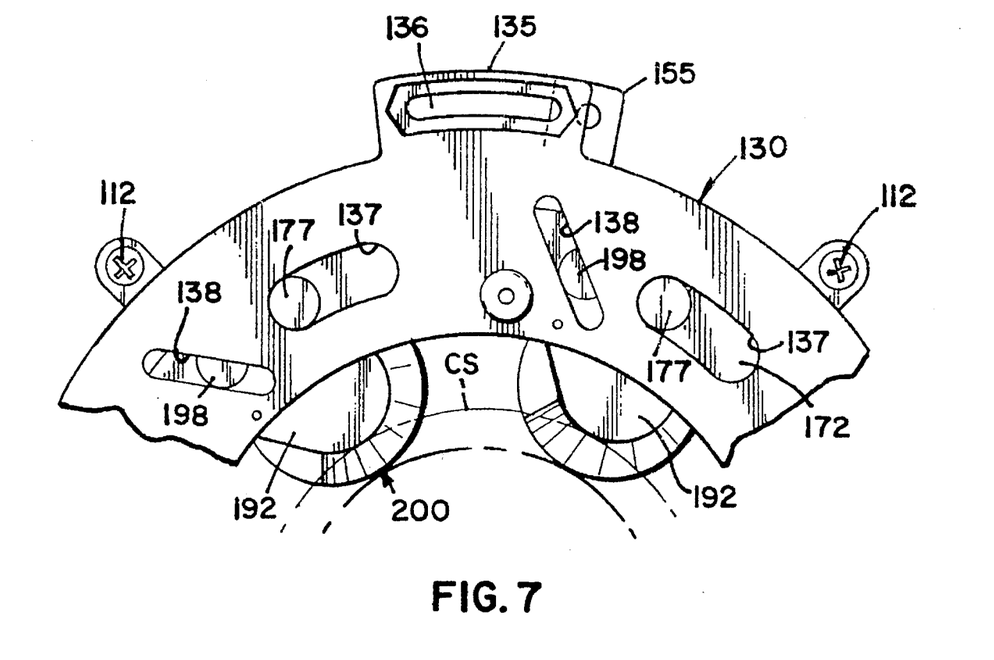
FIG. 7 is a bottom view of the cup dispenser depicted in FIG. 2.

As shown in FIG. 6, each of the cam assemblies 190 includes a first plate 191 and a second plate 192 secured together by a pair of shafts 193 and 194. A gear 195 is rotatably mounted on the first shaft 193 and maintained in proximity to the second plate 192 by a spacer 196 disposed between the gear 195 and the first plate 191. The teeth of the gear 195 extend beyond the perimeter of the second plate 192. A cam member 200 is rotatably mounted on the second shaft 194 in such a manner that teeth on a gear portion 201 of the cam member 200 engage the teeth on the gear 195. As a result, the gear 195 and the cam member 200 are constrained to rotate in opposite directions relative to one another.

Each of the cam members 200 includes a ledge 202 that extends beneath and thereby supports a portion of the rim on the lowermost cup in a stack. As shown in FIG. 2, for example, the ledges 202 cooperate to support the stack of nested cups CS disposed within the central opening 110. Each ledge 202 terminates at one end in a wall 203. As shown in FIG. 1, for example, rotation of the cam members 200 in the direction of the arrows can continue only until the walls 203 contact the rim on the lowermost cup. Each ledge 202 terminates at an opposite end in a downwardly sloping ramp 204, which in turn, abruptly terminates altogether. As shown in FIG. 2, for example, rotation of the cam members 200 in the direction of the arrows causes the rim of the lowermost cup to encounter the ramp 204 and thereby descend relative to the dispenser 100 and ultimately, to drop from the dispenser altogether.

Figure 8:
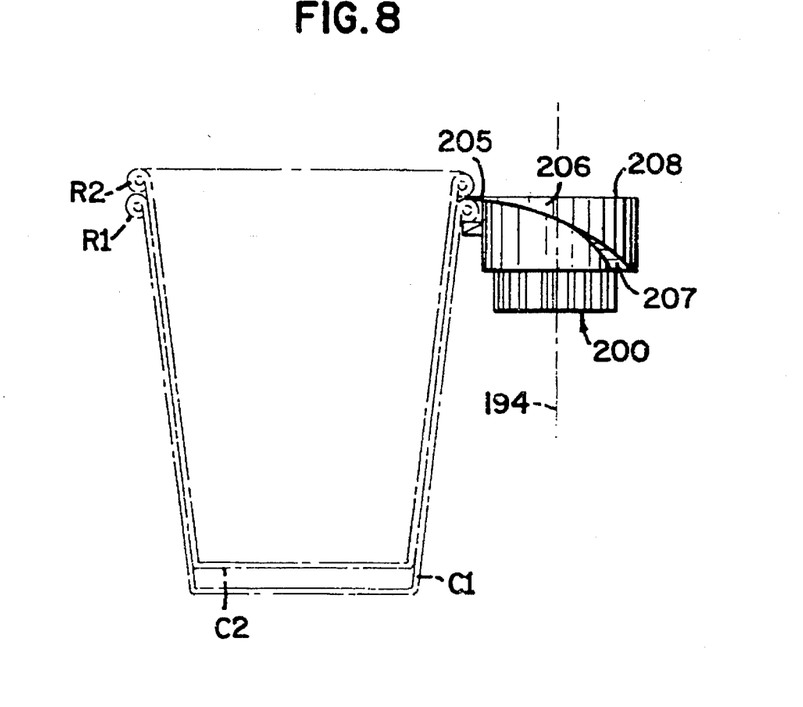
FIG. 8 is a side view of a portion of the cam assembly depicted in FIG. 6, shown in working relation to a stack of nested cups.

Each of the cam members 200 also includes a separating means, which is formed by an edge or knife 205 that continues as a wedge 206 disposed about the circumference of the cam member 200. The wedge 206 is bordered by a downwardly facing surface 207 that is disposed helically about the circumference of the cam member 200, and by an upwardly facing surface 208 that extends radially from the circumference of the cam member 200. As shown in FIG. 2, when the cam member 200 rotates in the direction of the arrow, the knife 205 trails slightly behind the abrupt termination of the ramp 204 but nonetheless engages the rims of the next lowest cup and the lowermost cup before the latter completely clears the ramp 204. As shown in FIG. 8, the knife 205 inserts between the rim R1 of the lowermost cup C1 and the rim R2 of the next lowest cup C2, and the wedge 206 parts or separates the two cups. The downwardly facing surface 207 imparts a downwardly directed force on the rim R1 of the lowermost cup C1 to encourage the lowermost cup to drop from the dispenser, while the upwardly facing surface 208 engages and supports the rim R2 of the next lowest cup C2 to prevent it from dropping as well.

An upper boss 197 extends from the first plate 191, and a lower boss 198 extends from the second plate 192 to provide a means for pivotally mounting the cam assemblies 190 relative to the case 180. In particular, the upper boss 197 of each cam assembly 190 projects through a respective hole 167 in the upper case member 160, and the lower boss 198 projects into a respective hole 176 in the lower case member 170. The bosses 197 and 198 are coaxially aligned with the shaft 193, so that each cam assembly 190 pivots about its respective first shaft 193.

Each cam assembly 190 further includes a peg 199 that extends from the first plate 191, and projects through a respective arcuate slot 168 in the upper case member 160 and into a respective linear slot 128 in the upper housing member 120. Also, the upper boss 197 of each cam assembly 190 projects beyond its respective hole 167 in the upper case member 160, and into a respective arcuate slot 127 in the upper housing member 120. As a result, pivoting of the cam assemblies 190 necessarily requires rotation of the case 180 relative to the housing 140, and vice versa. In addition to the upper bosses 197 that project into the arcuate slots 127, the case 180 is rotatably mounted relative to the housing 140 by means of the nubs 177 that extend from the end plate 172 (on the lower case member 170) and project into the arcuate slots 137 (in the lower housing member 130). The upper arcuate slots 127 align with the lower arcuate slots 137 when the housing is assembled, but the upper bosses 197 and the nubs 177 are offset relative to one another by the length of the arcuate slots 127 and 137.

Movement of the tab 165 (on the upper case member 160) relative to the flange 125 (on the upper housing member 120) causes rotation of the case 180 relative to the housing 140, and thereby adjusts the effective diameter of the cup dispenser 100 as defined by the positions of the cam assemblies 190 relative to one another. In this regard, the cam assemblies are adjustable to accommodate cup diameters ranging from 2.5 to 3.4375 inches. When the cam assemblies 190 are suitably positioned for dispensing cups of a desired under-rim diameter, the tab 165 is secured relative to the flange 125 by means of a nut 102 which mates with a screw (not shown) extending through the slot 126 (in the flange 125) and the hole 166 (in the tab 165).

When the cam assemblies 190 are pivotally mounted within the case 180, each of the cam members 200 must be properly aligned relative to the center of the opening 110 to ensure satisfactory operation of the dispenser 100. To this end, an aperture 209 is formed through the upper plate 191 and cam member 200 of each cam assembly 190. Proper alignment is assured by aligning each aperture 209 with a respective aperture 169 through the upper case member 160 and a respective aperture 129 through the upper housing member 120. This alignment feature facilitates proper assembly of the dispenser 100 and satisfactory performance over the entire range of under-rim cup diameters, particularly since the case 180 rotates relative to the housing 140 as the effective diameter of the dispenser is adjusted.

When the case 180 is assembled, the teeth on each gear 195 project through the openings 175 (in the lower case member 170) and into engagement with the teeth 151 (on the ring 150). As a result, rotation of the ring 150 in a clockwise direction causes the gears 195 to rotate in a clockwise direction, and the cam members 200 to rotate in a counter-clockwise direction, as shown by arrows in FIG. 1. On the other hand, rotation of the ring 150 in a counter-clockwise direction causes the gears 195 to rotate in a counter-clockwise direction, and the cam members 200 to rotate in a clockwise direction, as shown by arrows in FIG. 2. Thus, movement of the lever 155 (on the ring 150) relative to the flange 135 (on the lower housing member 130), first in the direction of the arrows in FIG. 1 and then in the direction of the arrows in FIG. 2, causes the cam assemblies 190 to lower and then dispense the lowermost cup.

The present invention is described above with reference to a preferred embodiment and a specific application, but those skilled in the art will recognize additional embodiments and applications that fall within the scope of the present invention. Accordingly, the present invention should be limited only by the following claims.

What is claimed is:

1. An apparatus of a type that dispenses a lowermost cup from a stack of nested cups, comprising:

a housing;

a case rotatably mounted within said housing, wherein said case includes an upper member and a lower member, and said upper member is fixed to said lower member;

a plurality of dispensing means, pivotally mounted within said case, between said upper member and said lower member, for dispensing the lowermost cup from the stack of nested cups;

an adjusting means for adjusting said plurality of dispensing means relative to said housing to accommodate an under-rim cup diameter of the nested cups; and an actuating means for actuating said plurality of dispensing means to dispense the lowermost cup from the stack of nested cups.

2. An apparatus according to claim 1, wherein a generally circular opening is formed through said housing and said case to allow passage of the nested cups.

3. An apparatus according to claim 2, wherein each of said plurality of dispensing means includes a cam member that projects at least partially into said opening.

4. An apparatus according to claim 3, wherein each said cam member is rotatable between a first orientation, wherein said cam member supports the lowermost cup, and a second orientation, wherein said cam member releases the lowermost cup.

5. An apparatus according to claim 4, wherein each of said plurality of dispensing means further includes a drive gear that is linked to said cam member and projects radially outward beyond said case, and said actuating means includes a ring rotatably mounted within said housing and relative to said case, and said ring has inwardly directed teeth that interlock with each said drive gear in such a manner that rotation of said ring causes rotation of each said drive gear, which in turn, causes rotation of each said cam member.

6. An apparatus according to claim 1, wherein said case rotates about a center of rotation, and rotation of said case relative to said housing causes contemporaneous pivoting of said dispensing means about respective pivot axes and rotation of said respective pivot axes about said center of rotation.

7. An apparatus according to claim 1, wherein said adjusting means causes said plurality of dispensing means to rotate together with said case relative to said housing as each of said plurality of dispensing means is pivoted relative to said case to accommodate the rim diameter of the nested cups.

8. An apparatus according to claim 1, wherein said adjusting means includes a peg projecting from each of said plurality of dispensing means; a corresponding linear slot formed through an end plate of said housing for each of said plurality of dispensing means; and a corresponding arcuate slot formed through an end plate of said case for each of said plurality of dispensing means, such that said corresponding linear slot intersects said corresponding arcuate slot to provide a common opening through which said peg projects, and rotation of said case relative to said housing causes each said common opening and each said peg to move and thereby pivots each of said plurality of dispensing means.

9. An apparatus of a type that dispenses a lowermost cup from a stack of nested cups, comprising:

a housing;

a case rotatably mounted within said housing;

a plurality of dispensing means, pivotally mounted within said case., for dispensing the lowermost cup from the stack of nested cups;

an adjusting means for adjusting said plurality of dispensing means relative to said housing to accommodate an under-rim cup diameter of the nested cups; and an actuating means for actuating said plurality of dispensing means to dispense the lowermost cup from the stack of nested cups, wherein said actuating means includes a ring mounted within said housing and rotatable relative to said case and said housing.

10. An apparatus according to claim 9, wherein each of said plurality of dispensing means includes a drive gear that projects outward beyond said case, and said ring includes inwardly directed teeth that interlock with each said drive gear in such a manner that rotation of said ring causes rotation of each said drive gear.

11. An apparatus of a type that dispenses a lowermost cup from a stack of nested cups, comprising:

a housing;

a case rotatably mounted within said housing; a plurality of dispensing means, pivotally mounted within said case, for dispensing the lowermost cup from the stack of nested cups;

an adjusting means for adjusting said plurality of dispensing means relative to said housing to accommodate an under-rim cup diameter of the nested cups;

an actuating means for actuating said plurality of dispensing means to dispense the lowermost cup from the stack of nested cups; and an aligning means for facilitating alignment of said dispensing means relative to one another during assembly of the apparatus.

12. An apparatus according to claim 11, wherein said aligning means includes a first aperture formed through at least a portion of each of said plurality of dispensing means, and a corresponding aperture formed through said housing in such a manner that each said first aperture aligns with each said corresponding aperture when all of said plurality of dispensing means are similarly oriented relative to a center of said housing.

13. An apparatus of a type that dispenses a lowermost cup from a stack of nested cups, comprising:

a housing having an opening formed through said housing;

a plurality of dispensing means mounted within said housing and projecting at least partially into said opening to selectively support and dispense the lowermost cup;

an adjusting means for adjusting to what extent said plurality of dispensing means project into said opening to accommodate an under-rim cup diameter of the nested cups, wherein said adjusting means contemporaneously pivots and revolves said plurality of dispensing means relative to said housing; and an actuating means for actuating said plurality of dispensing means to dispense the lowermost cup from the stack of nested cups.

14. An apparatus according to claim 13, wherein when said plurality of dispensing means are adjusted to a position of minimum projection into said opening, each of said plurality of dispensing means occupies a desired orientation relative to a center of said opening for purposes of selectively supporting and dispensing the lowermost cup.

15. An apparatus according to claim 14, further comprising an alignment verifying means for verifying that each of said plurality of dispensing means occupies said desired orientation.

16. An apparatus according to claim 15, wherein said alignment verifying means includes corresponding apertures formed through portions of said housing and each of said plurality of dispensing means, and said corresponding apertures align only when said dispensing means occupy said desired orientation.

17. An apparatus according to claim 14, wherein as said plurality of dispensing means pivot farther into said opening, said plurality of dispensing means also revolve about said opening so as to reduce deviation from said desired orientation relative to said center of said opening.

18. An apparatus according to claim 13, wherein each of said plurality of dispensing means includes a cam member that projects at least partially into said opening and is rotatable between a first orientation, wherein said cam member supports the lowermost cup, and a second orientation, wherein said cam member releases the lowermost cup, and said actuating means includes a ring rotatably mounted relative to said housing and said plurality of cam members, and each of said plurality of dispensing means further includes a drive gear that links rotation of said ring to rotation of said cam member.

19. An apparatus according to claim 18, wherein said adjusting means includes a case rotatably mounted within said housing, and said plurality of dispensing means are pivotably mounted relative to said case, and linear slots in said housing and arcuate slots in said case cooperate with pegs on said plurality of dispensing means to pivot said plurality of dispensing means relative to said case as said case rotates relative to said housing.

20. An apparatus of a type that dispenses a lowermost cup from a stack of nested cups, comprising:

a housing;

a case mounted within said housing;

a plurality of dispensing means, pivotably mounted within said case, for dispensing the lowermost cup from the stack of nested cups;

an adjusting means for adjusting said plurality of dispensing means relative to said housing to accommodate an under-rim cup diameter of the nested cups;

an actuating means for actuating said plurality of dispensing means to dispense the lowermost cup from the stack of nested cups;

an aligning means for aligning each of said plurality of dispensing means relative to said case prior to mounting of said case within said housing; and a holding means for holding each of said plurality of dispensing means in alignment with said case prior to mounting of said case within said housing.

21. An apparatus according to claim 20, wherein each of said dispensing means includes a cam member that projects at least partially into said opening and is rotatable between a first orientation, wherein said cam member supports the lowermost cup, and a second orientation, wherein said cam member releases the lowermost cup.

22. An apparatus according to claim 20, wherein said adjusting means includes a peg projecting from each of said plurality of dispensing means; a corresponding linear slot formed through an end plate of said housing for each of said plurality of dispensing means; and a corresponding arcuate slot formed through an end plate of said case for each of said plurality of dispensing means, such that said corresponding linear slot intersects said corresponding arcuate slot to provide a common opening through which said peg projects, and rotation of said case relative to said housing causes each said common opening and each said peg to move and thereby pivots each of said plurality of dispensing means.

23. An apparatus according to claim 20, wherein said actuating means includes a ring mounted within said housing and rotatable relative to said case and said housing.

24. An apparatus according to claim 20, wherein each of said plurality of dispensing means includes a drive gear that projects outward beyond said case, and said ring includes inwardly directed teeth that interlock with each said drive gear in such a manner that rotation of said ring causes rotation of each said drive gear.

25. An apparatus according to claim 20, wherein said aligning means includes a first aperture formed through at least a portion of each of said plurality of dispensing means, and a corresponding aperture formed through said housing in such a manner that each said first aperture aligns with each said corresponding aperture when all of said plurality of dispensing means are similarly oriented relative to a center of said housing.

* * * * *